(12) United States Patent
Kumar

(10) Patent No.: US 10,038,595 B2
(45) Date of Patent: *Jul. 31, 2018

(54) OVERLAY TUNNEL AND UNDERLAY PATH CORRELATION

(71) Applicant: Juniper Networks, Inc., Sunnyvale, CA (US)

(72) Inventor: Jainendra Kumar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,712

(22) Filed: Jul. 3, 2017

(65) Prior Publication Data

US 2017/0302519 A1 Oct. 19, 2017

Related U.S. Application Data

(62) Division of application No. 14/316,192, filed on Jun. 26, 2014, now Pat. No. 9,699,030.

(51) Int. Cl.
*H04W 84/18* (2009.01)
*H04L 12/24* (2006.01)

(52) U.S. Cl.
CPC ................ *H04L 41/0853* (2013.01)

(58) Field of Classification Search
CPC ........ H04W 84/18; H04L 41/12; H04L 45/02; H04L 45/00; H04L 45/04; H04L 41/04
See application file for complete search history.

(56) References Cited

U.S. PATENT DOCUMENTS

| 9,699,030 | B1 | 7/2017 | Kumar |
| 2004/0136385 | A1* | 7/2004 | Xue ........................ H04L 45/00 370/401 |
| 2008/0137544 | A1 | 6/2008 | Geck |
| 2011/0090814 | A1 | 4/2011 | Legg |
| 2015/0103679 | A1 | 4/2015 | Tessmer |
| 2016/0007392 | A1 | 1/2016 | Bondrescu |

* cited by examiner

*Primary Examiner* — Hassan Phillips
*Assistant Examiner* — Prenell Jones
(74) *Attorney, Agent, or Firm* — Harrity & Harrity, LLP

(57) ABSTRACT

A device may receive an indication to generate a probe packet associated with a tunnel included in a first network. The tunnel may include a first tunnel endpoint and a second tunnel endpoint and may correspond to a path, associated with a second network, between the first tunnel endpoint and the second tunnel endpoint. The device may generate the probe packet including information associated with the tunnel. The device may provide the probe packet, via the first tunnel endpoint, such that the probe packet is received by a network device that lies on the path. The device may receive a response packet, associated with the probe packet and provided by the network device, that includes path information. The path information may include information associated with the network device. The device may store the path information to allow the network device to be identified as lying on the path.

20 Claims, 11 Drawing Sheets

OVERLAY TUNNEL AND UNDERLAY PATH CORRELATION

RELATED APPLICATION

This application is a divisional of U.S. patent application Ser. No. 14/316,192, filed Jun. 26, 2014 (now U.S. Pat. No. 9,699,030), which is incorporated herein by reference.

BACKGROUND

An overlay network is a network that is built on the top of another network. Devices in an overlay network may be connected by an overlay tunnel (e.g., a virtual link and/or a logical link associated with the overlay network). The overlay tunnel may correspond to an underlay path, associated with an underlay network, that passes traffic, associated with the overlay tunnel, through one or more physical devices that lie on the underlay path.

SUMMARY

According to some possible implementations, a device may include one or more processors to: receive an indication to generate a probe packet associated with a tunnel included in a first network, where the tunnel may include a first tunnel endpoint and a second tunnel endpoint, and where the tunnel may correspond to a path, associated with a second network, between the first tunnel endpoint and the second tunnel endpoint; generate the probe packet, where the probe packet may include information associated with the tunnel; provide the probe packet, where the probe packet may be provided via the first tunnel endpoint and may be provided such that the probe packet is received by a network device that lies on the path; receive a response packet, associated with the probe packet, that includes path information, where the response packet may be provided by the network device, and where the path information may include information associated with the network device; and store the path information, where the path information may be stored to allow the network device to be identified as lying on the path.

According to some possible implementations, a computer-readable medium may store one or more instructions that, when executed by one or more processors, cause the one or more processors to: generate an overlay probe packet, where the overlay probe packet may include information associated with an overlay tunnel included in an overlay network, where the overlay tunnel may include a first tunnel endpoint and a second tunnel endpoint, and where the overlay tunnel may correspond to an underlay path, associated with an underlay network, between the first tunnel endpoint and the second tunnel endpoint; provide the overlay probe packet via the first tunnel endpoint, where the overlay probe packet may be provided to cause the overlay probe packet to be parsed by a network device that lies on the underlay path; receive a response packet that includes underlay path information, where the response packet may be associated with the overlay probe packet and may be provided by the network device, and where the underlay path information may include information associated with the network device; and store the underlay path information, where the underlay path information may be stored to indicate that the network device lies on the underlay path.

According to some possible implementations, a method may include: receiving, by a device, an indication to generate a probe packet associated with a tunnel included in a virtual network, where the tunnel may include a first tunnel endpoint and a second tunnel endpoint, and where the tunnel may correspond to a path, associated with a physical network, between the first tunnel endpoint and the second tunnel endpoint; generating, by the device, the probe packet based on receiving the indication to generate the probe packet, where the probe packet may include information associated with the tunnel; providing, by the device, the probe packet, where the probe packet may be provided via the first tunnel endpoint to cause the probe packet to be received by a network device that lies on the path; receiving, by the device, a response packet, associated with the probe packet, that includes path information, where the response packet may be provided by the network device, and where the path information may include information that identifies the network device; and causing, by the device, the path information to be stored, where the path information may be stored to allow the network device to be identified as lying on the path that corresponds to the tunnel.

DETAILED DESCRIPTION

The following detailed description of example implementations refers to the accompanying drawings. The same reference numbers in different drawings may identify the same or similar elements.

A source device may be configured to send traffic (e.g., application traffic, virtual machine traffic, etc.) to a destination device via an overlay tunnel associated with the source device and the destination device. However, underlay path information, associated with an underlay path that corresponds to the overlay tunnel, may be abstracted out such that the underlay path information is not stored by the source device. As such, a user of the source device may not be able to view underlay path information associated with the overlay tunnel (e.g., for diagnostics purposes, for service level agreement (SLA) compliance monitoring purposes, etc.). Implementations described herein may allow a source device to probe an overlay tunnel in order to determine underlay path information associated with an underlay path that corresponds to the overlay tunnel.

Figure 1A:
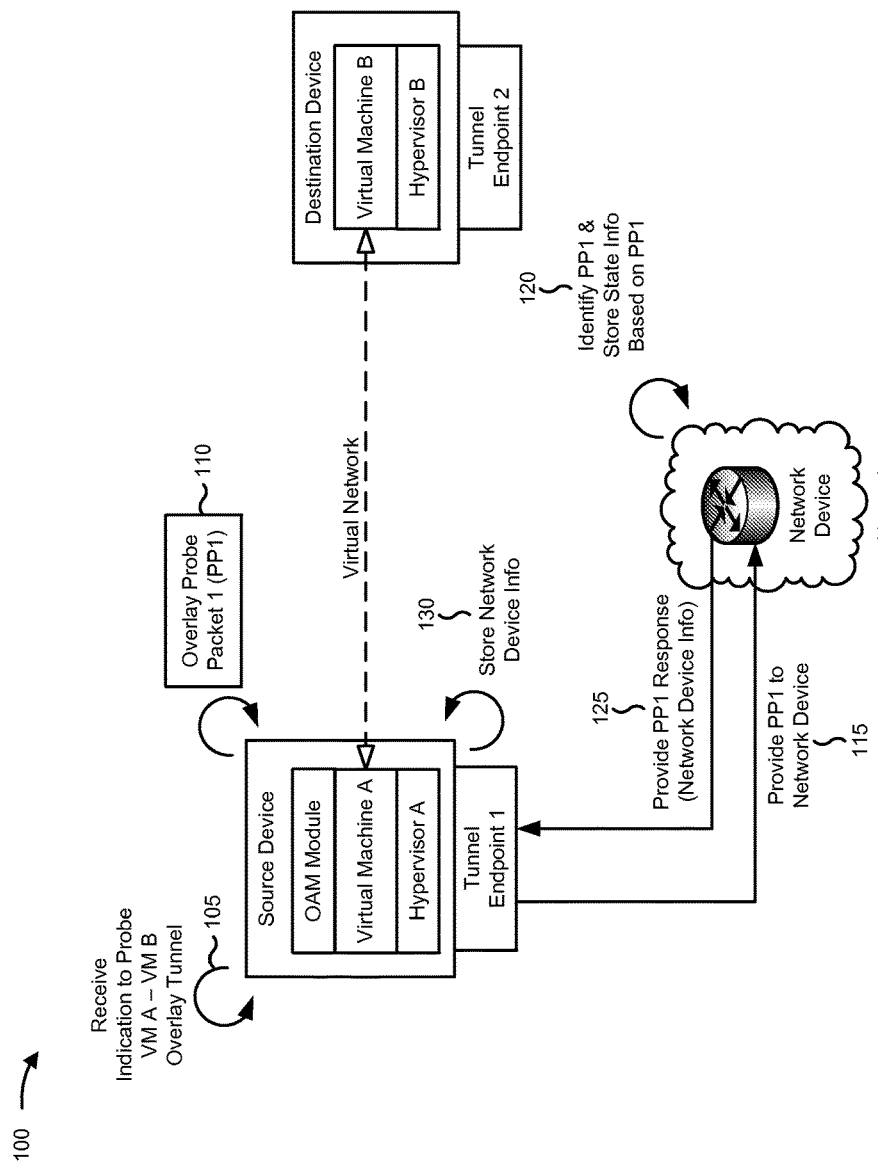
FIGS. 1A and 1B are diagrams of an overview of an example implementation described herein.
Figure 1B:
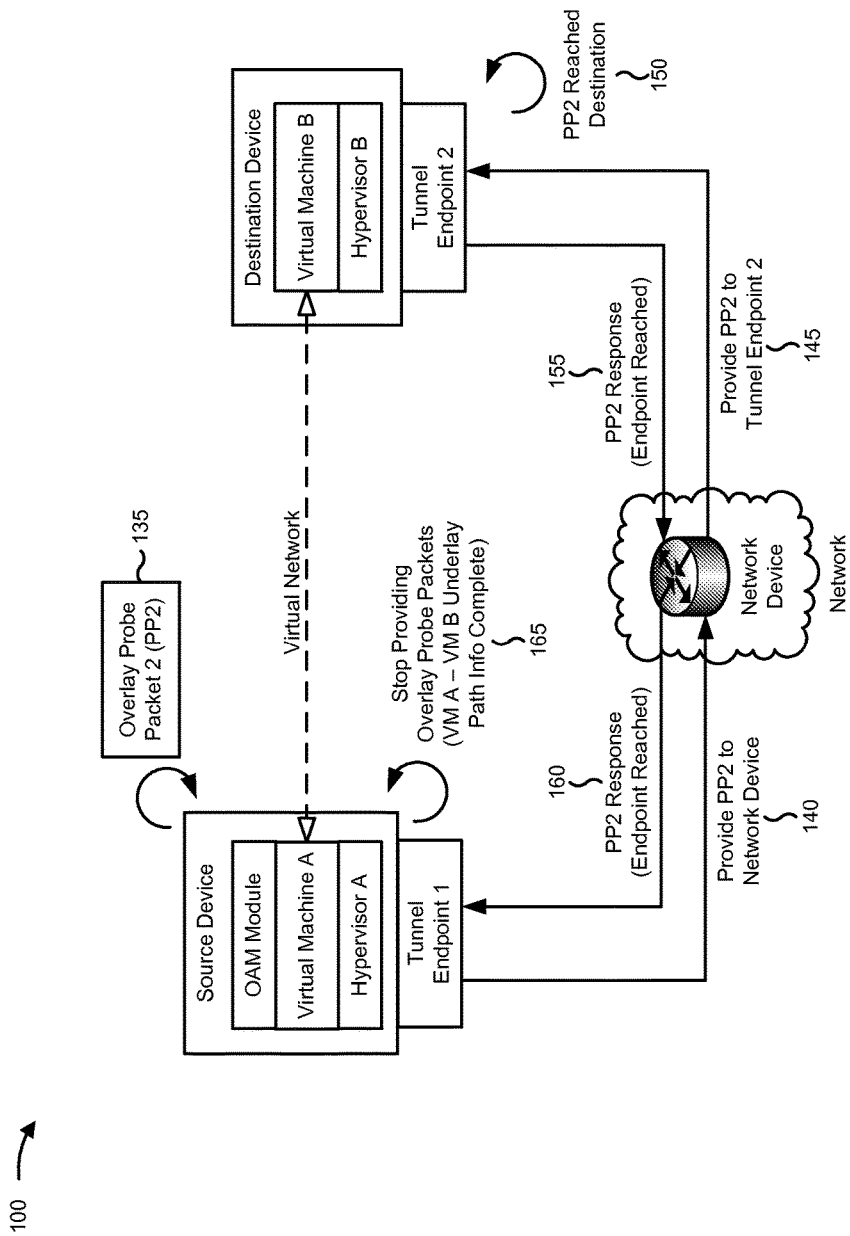

FIGS. 1A and 1B are diagrams of an overview of an example implementation 100 described herein. For the purposes of example implementation 100, assume that a source device hosts a first hypervisor (e.g., hypervisor A) that manages a first virtual machine (e.g., virtual machine A), and an operations, administration, and management (OAM) module associated with determining underlay path information corresponding to an overlay tunnel. Further, assume that a destination device hosts a second hypervisor (e.g., hypervisor B) that manages a second virtual machine (e.g., virtual machine B). Finally, assume that virtual machine A and virtual machine B are included in a virtual network (e.g., a virtual extensible local area network (VXLAN)) that allows virtual machine A and virtual machine B to communicate via an overlay tunnel that includes two tunnel endpoints (e.g., tunnel endpoint 1 and tunnel endpoint 2).

As shown in FIG. 1A, and by reference number 105, the source device may receive (e.g., via the OAM module) an indication to probe the overlay tunnel between virtual machine A and virtual machine B (e.g., in order to determine underlay path information associated with an underlay path that corresponds to the overlay tunnel). As shown by reference number 110, the source device (e.g., the OAM module, hypervisor A, etc.) may generate a first overlay probe packet (e.g., overlay probe packet 1). For the purposes of FIG. 1A, assume that overlay probe packet 1 includes a counter that limits the lifespan of overlay probe packet 1 to one network hop. As shown by reference number 115, the source device may provide (e.g., via tunnel endpoint 1) overlay probe packet 1 to a network device included in a network associated with the overlay tunnel.

As shown by reference number 120, the network device may receive overlay probe packet 1, may hold overlay probe packet 1 (e.g., based on the counter included in overlay probe packet 1), and may identify overlay probe packet 1 as an overlay probe packet. As shown, the network device may store state information, associated with the overlay tunnel, based on information included in overlay probe packet 1 (e.g., the network device may store information associated with virtual machine A, virtual machine B, tunnel endpoint 1, tunnel endpoint 2, the virtual network, etc.). As shown by reference number 125, the network device may also provide, to the source device, an overlay probe packet 1 response that includes information associated with the network device (e.g., information indicating that the network device lies on the underlay path that corresponds to the overlay tunnel). As shown by reference number 130, the source device may store the information associated with the network device.

As shown in FIG. 1B, and by reference number 135, the source device may generate a second overlay probe packet (e.g., overlay probe packet 2) based on receiving the response to the first overlay probe packet. For the purposes of FIG. 1B, assume that overlay probe packet 2 includes a counter that limits the lifespan of overlay probe packet 2 to two network hops. As shown by reference number 140, the source device may provide (e.g., via tunnel endpoint 1) overlay probe packet 2 to the network device. As shown by reference number 145, the network device may provide (e.g., based on the counter associated with overlay probe packet 2) overlay probe packet 2 to the next hop associated with the overlay tunnel, tunnel endpoint 2 (e.g., assume that the network device is the only network device that lies on the underlay path that corresponds to the overlay tunnel between virtual machine A and virtual machine B).

As shown by reference number 150, tunnel endpoint 2 may receive overlay probe packet 2, and may determine that overlay probe packet 2 has reached its destination (e.g., since overlay probe packet 2 has reached tunnel endpoint 2 associated with the destination device). As shown by reference number 155, tunnel endpoint 2 (e.g., hypervisor B) may generate and provide, to the network device, an overlay probe packet 2 response that indicates that overlay probe packet 2 has reached the endpoint of the overlay tunnel. As shown by reference number 160, the network device may forward the overlay probe packet 2 response to the source device (e.g., via tunnel endpoint 1). As shown by reference number 165, the source device may receive the overlay probe packet 2 response, and may stop providing overlay probe packets associated with the overlay tunnel (e.g., since overlay probe packet 2 reached the endpoint of the overlay tunnel). At this point, the source device stores underlay information associated with the underlay path that corresponds to the overlay tunnel between virtual machine A and virtual machine B (e.g., information identifying that the network device that lies on the underlay path, etc.). Moreover, the network device has stored information indicating that the overlay tunnel passes traffic via the network device. In this way, a source device may probe an overlay tunnel in order to determine underlay path information associated with an underlay path that corresponds to the overlay tunnel.

Figure 2:
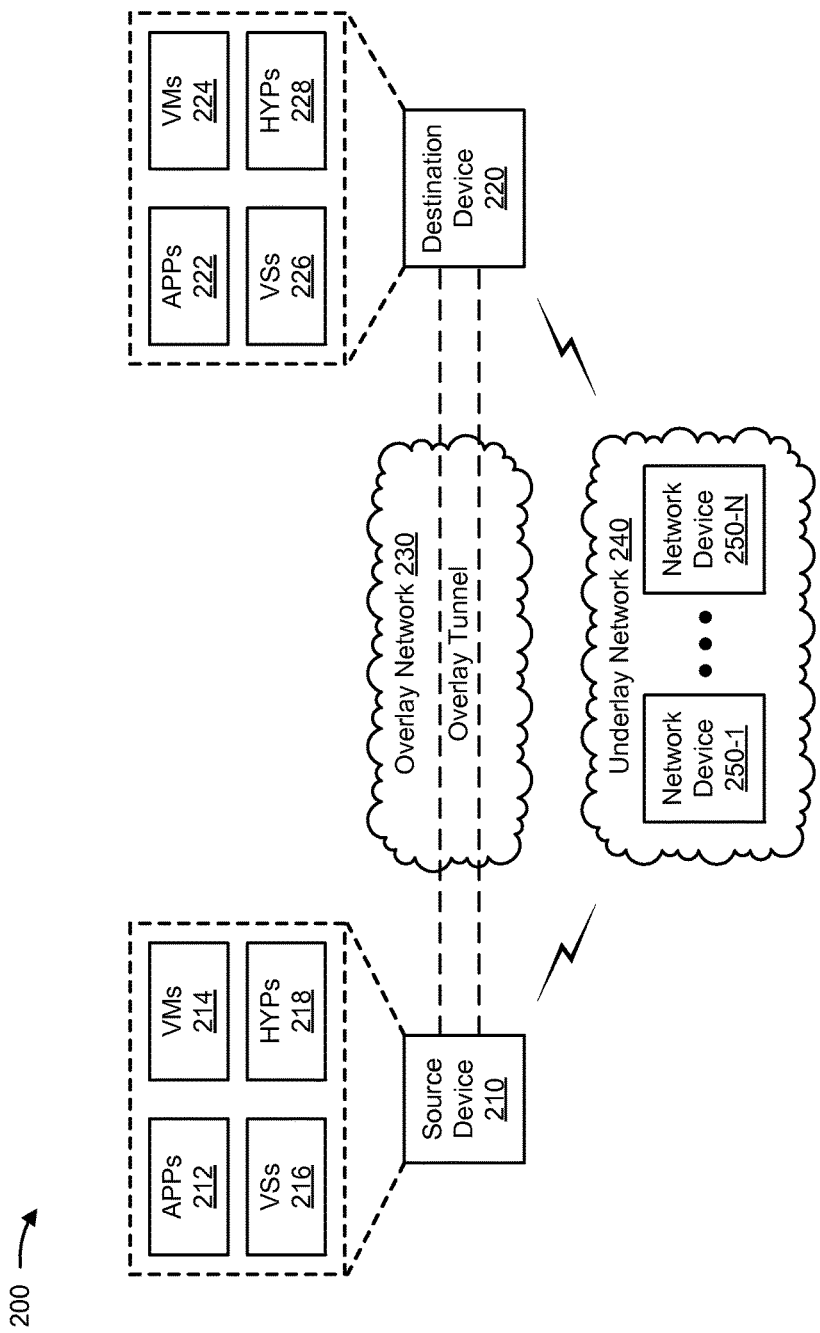
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 210, a destination device 220, an overlay underlay network 230, an underlay network 240, and one or more network devices 250-1 through 250-N (N≥1) (hereinafter collectively referred to as network devices 250 and individually as network device 250). Devices of environment 200 may interconnect via wired connections, wireless connections, or a combination of wired and wireless connections.

Source device 210 may include a device capable of communicating with another device via overlay network 230. For example, source device 210 may include a switch, a router, a server, a gateway, a modem, a firewall, a network interface card (NIC), a hub, a bridge, an optical add/drop multiplexer (OADM), or another type of device. In some implementations, source device 210 (e.g., an OAM module hosted by source device 210) may be capable of generating and providing overlay probe packets associated with an overlay tunnel associated with overlay network 230. Additionally, or alternatively, source device 210 may be capable of determining (e.g., based on receiving a response packet associated with an overlay probe packet) underlay path information, associated with an underlay path that corresponds to an overlay tunnel, and storing the underlay path information.

In some implementations, source device 210 may include a virtual device implemented on one or more server devices. As shown, in FIG. 2, source device 210 may include applications (APPs) 212, one or more virtual machines (VMs) 214, one or more virtualized storages (VSs) 216, one or more hypervisors (HYPs) 218, etc.

Application 212 may include one or more software applications that may be hosted by source device 210. For example, application 212 may include operations, administration, and management (OAM) software (e.g., an OAM module), database software, monitoring software, financial software, communication software, and/or another type of software. In some implementations, one application 212 may send and/or receive information to and/or from one or more other applications 212 via virtual machine 214.

Virtual machine 214 may include a software implementation of a machine that is capable of executing a program like a physical machine. In some implementations, virtual machine 214 may be a system virtual machine or a process virtual machine. A system virtual machine may provide a complete system platform that supports execution of a complete operating system (OS). A process virtual machine may execute a single program, and may support a single process. In some implementations, virtual machine 214 may execute on behalf of a user (e.g., a user of source device 210).

Virtualized storage 216 may include one or more storage systems and/or one or more devices that use virtualization techniques within the storage systems or devices of source device 210.

Hypervisor 218 may provide hardware virtualization techniques that allow multiple operating systems (e.g., executed by one or more virtual machines 214) to execute on a host device, such as source device 210. Hypervisor 218 may present a virtual operating platform to the multiple operating systems and/or may manage the execution of the multiple operating systems. Multiple instances of a variety of operating systems may share virtualized hardware resources. In some implementations, hypervisor 218 may be associated with an endpoint of an overlay tunnel associated with overlay network 230.

Destination device 220 may include a device capable of communicating with another device via overlay network 230. For example, destination device 220 may include a switch, a router, a server, a gateway, a modem, a firewall, a NIC, a hub, a bridge, an OADM, or another type of device. In some implementations, destination device 220 may include a virtual device implemented on one or more server devices. As shown, in FIG. 2, destination device 220 may include one or more APPs 222, one or more VMs 224, one or more VSs 226, and/or one or more HYPs 228 (e.g., similar to APPs 212, VMs 214, VSs 216, and HYPs 218 described above with regard to source device 210).

Overlay network 230 may include a virtual network through which source device 210 may communicate with destination device 220. For example, overlay network 230 may include a VXLAN or another type of virtual network. In some implementations, overlay network 230 may include an overlay tunnel defined by a set of tunnel endpoints, such as a set of VXLAN tunnel endpoints (VTEPs). In some implementations, overlay network 230 may include multiple overlay tunnels. In some implementations, overlay network 230 may be configured such that traffic travelling through an overlay tunnel travels through a corresponding underlay path associated with underlay network 240.

Underlay network 240 may include one or more wired and/or wireless networks that provide underlay paths for overlay tunnels included in overlay network 230. For example, underlay network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, underlay network 240 may include a layer 2 network (e.g., a data link layer network) and/or a layer 3 network (e.g., a network layer network). In some implementations, an overlay tunnel, including in overlay network 230, may traverse underlay network 240 via an underlay path that includes one or more network devices 250 included in underlay network 240.

Network device 250 may include one or more devices, included in underlay network 240, that may lie on an underlay path that corresponds to an overlay tunnel included in overlay network 230. For example, network device 250 may include a switch, a router, a server, a gateway, a modem, a firewall, a NIC, a hub, a bridge, a OADM, or another type of device included in underlay network 240. In some implementations, network device 250 may be capable of receiving an overlay probe packet, identifying the overlay probe packet as an overlay probe packet, and providing a response packet associated with the overlay probe packet. Additionally, or alternatively, network device 250 may be capable of determining (e.g., based on receiving an overlay probe packet) overlay tunnel information associated with an overlay tunnel, and storing the overlay tunnel information.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
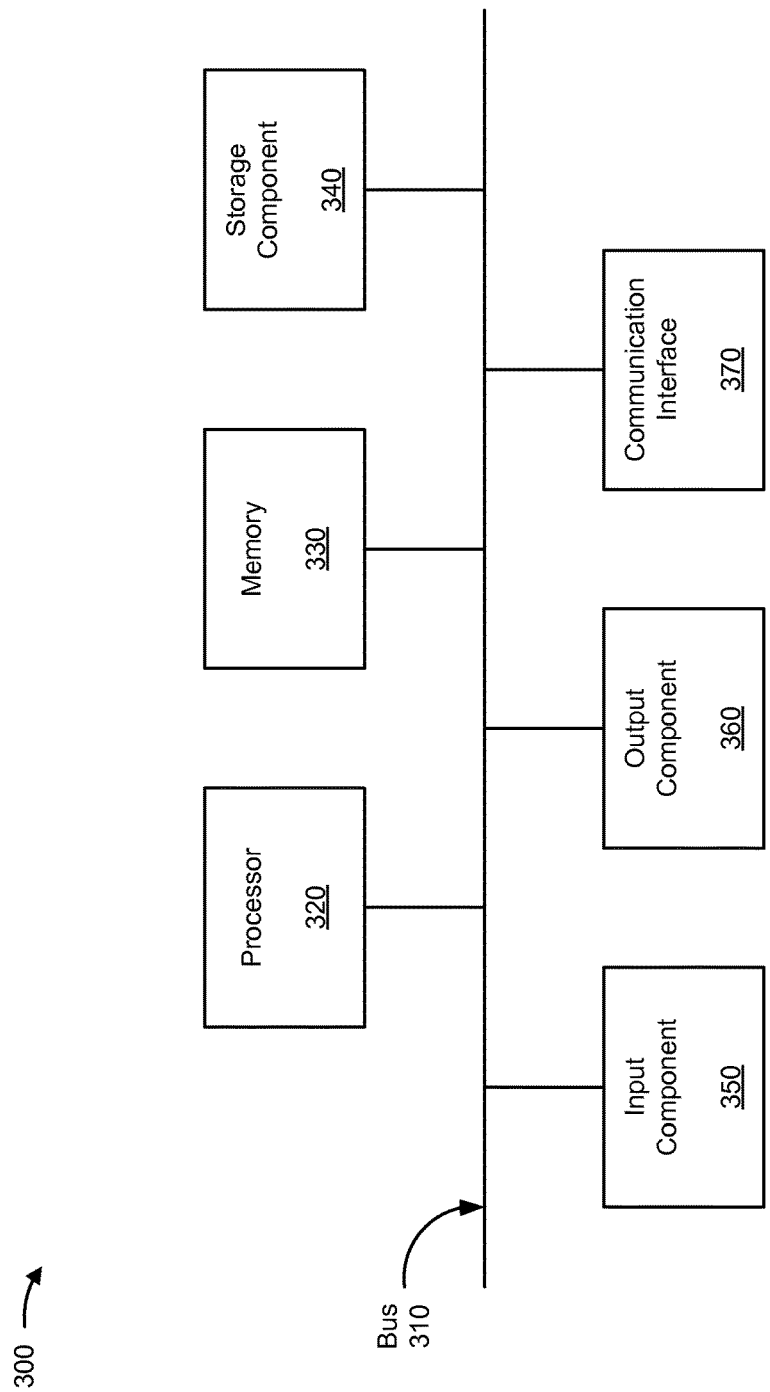
FIG. 3 is a diagram of example components of one or more devices of FIG. 2.

FIG. 3 is a diagram of example components of a device 300. Device 300 may correspond to source device 210, destination device 220, and/or network device 250. In some implementations, source device 210, destination device 220, and/or network device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
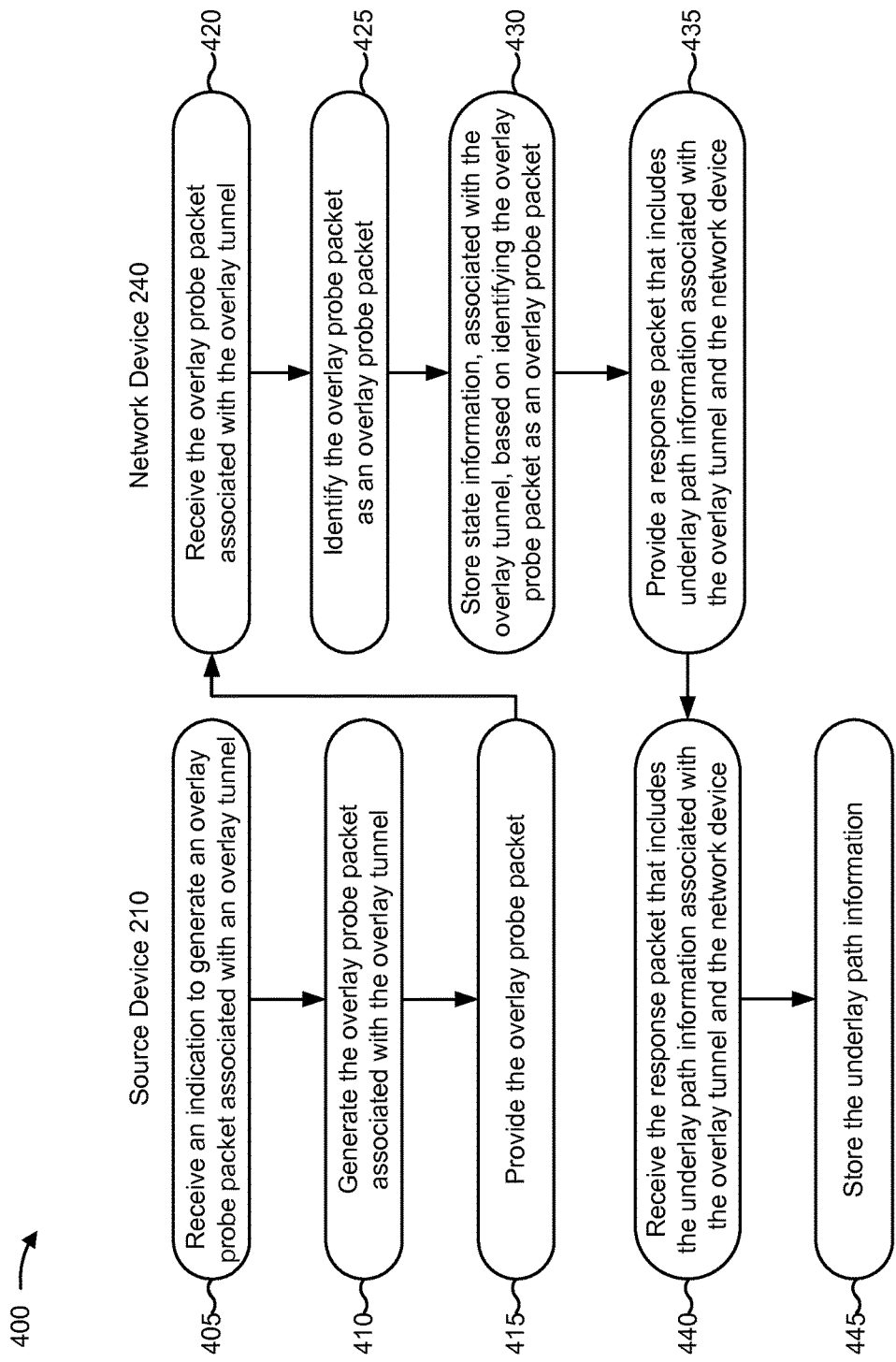
FIG. 4 is a flow chart of an example process for generating and providing an overlay tunnel probe packet, and receiving and storing a response packet that includes underlay path information associated with the overlay tunnel and a network device.

FIG. 4 is a flow chart of an example process 400 for generating and providing an overlay tunnel probe packet, and receiving and storing a response packet that includes underlay path information associated with the overlay tunnel and a network device. In some implementations, one or more process blocks of FIG. 4 may be performed by source device 210. For example, one or more process blocks may be performed by one or more computing resources associated with source device 210, such as APP 212, VM 214, and/or HYP 218. Additionally, or alternatively, one or more process blocks of FIG. 4 may be performed by network device 250. Additionally, or alternatively, one or more process blocks may be performed by another device, such as destination device 220.

As shown in FIG. 4, process 400 may include receiving an indication to generate an overlay probe packet associated with an overlay tunnel (block 405). For example, source device 210 (e.g., an OAM module) may receive an indication to generate an overlay probe packet associated with an overlay tunnel included in overlay network 230.

An overlay probe packet may include a packet that may be used to determine information associated with an underlay path that corresponds to an overlay tunnel. For example, assume that source device 210 (e.g., VM 214) and destination device 220 (e.g., VM 224) are included in overlay network 230 (e.g., a VXLAN) that allows VM 214 and VM 224 to communicate via an overlay tunnel defined by a first tunnel endpoint (e.g., a VTEP associated with HYP 218) and a second tunnel endpoint (e.g., a VTEP associated with HYP 228). In this example, source device 210 may store information associated with overlay network 230, the first tunnel endpoint, and/or the second tunnel endpoint, but source device 210 may not store underlay path information associated with network devices 250 that lie on an underlay path (e.g., included in underlay network 240) between the first tunnel endpoint and the second tunnel endpoint. In other words, source device 210 may not store information associated with network devices 250 through which VM 214 may communicate with VM 224. Here, an overlay probe packet may be used to determine underlay path information associated with network devices 250 that lie on the underlay path that corresponds to the overlay tunnel between the first tunnel endpoint and the second tunnel endpoint.

In some implementations, the indication may include information associated with the overlay tunnel. For example, the indication may include information that identifies overlay network 230 associated with source device 210 and destination device 220 (e.g., a VXLAN network identifier (VNID), information that identifies source device 210 and/or VM 214 associated with the overlay tunnel (e.g., an internet protocol (IP) address, a media access control (MAC) address, etc.), information that identifies destination device 220 and/or VM 224 associated with the overlay tunnel (e.g., an IP address, a MAC address, etc.), information that identifies an overlay tunnel endpoint (e.g., a VTEP) associated with source device 210 and/or HYP 218 (e.g., an IP address, a MAC address, etc.), information that identifies an overlay tunnel endpoint associated with destination device 220 and/or HYP 228 (e.g., an IP address, a MAC address, etc.), or another type of information.

In some implementations, the indication may include partial information associated with the overlay tunnel, and source device 210 may determine additional information associated with the overlay tunnel. For example, the indication may include information that identifies VM 214 and VM 224 associated with the overlay tunnel that is to be probed, and source device 210 may determine (e.g., based on information stored by source device 210 and/or another device), additional information that identifies a VTEP associated with HYP 218, information that identifies a VTEP associated with HYP 228, information that identifies a network device 250 to which the overlay probe packet is to be provided, etc.

In some implementations, source device 210 may receive the indication via an application program interface (API) associated with source device 210. For example, source device 210 may expose a set of APIs (e.g., a set of representational state transfer (REST) APIs) that allow source device 210 to receive (e.g., from a network topology controller, from an overlay controller, etc.) information indicating that source device 210 is to determine underlay path information associated with a particular overlay tunnel, and source device 210 may receive the indication to generate the overlay probe packet based on the information received via the set of APIs. Additionally, or alternatively, source device 210 may receive the indication based on user input. For example, a user of source device 210 may provide user input indicating that source device 210 is to determine underlay path information corresponding to a particular overlay tunnel, and source device 210 may receive the indication to generate the overlay probe packet based on the user input.

Additionally, or alternatively, source device 210 may receive the indication based on receiving underlay path information associated with the overlay tunnel. For example, source device 210 may receive a first indication, generate a first overlay probe packet, and provide the first overlay probe packet, as described below. In this example, source device 210 may receive a first response packet, associated with the first overlay packet, that includes first underlay path information, and source device 210 may receive a second indication to generate a second overlay probe packet based on receiving the first underlay information (e.g., to cause source device 210 to receive second underlay information associated with the second underlay packet). In this way, source device 210 may receive multiple indications that cause source device 210 to generate multiple overlay probe packets associated with the overlay tunnel.

As further shown in FIG. 4, process 400 may include generating the overlay probe packet associated with the overlay tunnel (block 410). For example, source device 210 (e.g., the OAM module, HYP 218, etc.) may generate the overlay probe packet associated with the overlay tunnel. In some implementations, source device 210 may generate the overlay probe packet after source device 210 receives the indication to generate the overlay probe packet associated with the overlay tunnel. Additionally, or alternatively, source device 210 may generate the overlay probe packet when source device 210 receives, from another device (e.g., network device 250), information indicating that source device 210 is to generate the overlay probe packet.

In some implementations, source device 210 may generate the overlay probe packet such that the overlay probe packet mimics virtual machine traffic when passed through the overlay tunnel. For example, source device 210 may generate the overlay probe packet such that the overlay probe packet includes an outer MAC header (e.g., including a source MAC address that identifies a first VTEP, associated with source device 210, and a destination MAC address that identifies a first network device 250 associated with the overlay tunnel), an outer IP header (e.g., including a source IP address that identifies the first VTEP and a destination IP address that identifies a second VTEP associated with destination device 220), an outer user datagram protocol (UDP) header (e.g., including information that identifies a source port associated with the VXLAN, information that identifies a destination port associated with the VXLAN, etc.), an overlay network 230 header (e.g., including information that identifies the VXLAN associated with the overlay tunnel, etc.), an OAM header (e.g., including information that identifies a port associated with the OAM module, information that identifies the overlay probe packet as an overlay probe packet, etc.), a payload (e.g., including a MAC address that identifies VM 214, an IP address that identifies VM 214, a MAC address that identifies VM 224, an IP address that identifies VM 224, etc.), and/or another type of information.

In some implementations, the overlay probe packet may also include a counter. For example, the overlay probe packet may include a counter (e.g., a network hop counter, a time to live (TTL) counter, etc.) indicating that the overlay probe packet is to be forwarded along the underlay path for a particular amount of network hops. For example, source device 210 may generate a first overlay probe packet that includes a TTL counter with a value of one. In this example, source device 210 may provide the first overlay probe packet to a first network device 250 (e.g., a first network hop associated with the overlay tunnel). The first network device 250 may receive the first overlay probe packet, may determine (e.g., after decreasing the TTL counter value from one to zero) that the first network device 250 is to provide a first response packet to source device 210, and may provide the first response packet, as described below.

Continuing with this example, source device 210 may receive the first response packet, may generate a second overlay probe packet that includes a TTL counter with a value of two, and may provide the second overlay probe packet to the first network device 250. The first network device 250 may receive the second overlay probe packet, may decrease the TTL counter value by one (e.g., from two to one), and may provide the second overlay probe packet to a second network device 250 (e.g., a second network hop associated with the overlay tunnel). The second network device 250 may receive the second overlay probe packet, may determine (e.g., after decreasing the TTL counter value from one to zero) that the second network device 250 is to provide a second response packet to source device 210, and may provide the second response packet. In this way, source device 210 may generate multiple overlay probe packets, with increasing counter values, that may allow source device 210 to receive underlay path information associated with multiple network devices 250 that lie on the underlay path associated with the overlay tunnel.

As further shown in FIG. 4, process 400 may include providing the overlay probe packet (block 415). For example, source device 210 (e.g., the OAM module, HYP 218, etc.) may provide the overlay probe packet generated by source device 210. In some implementations, source device 210 may provide the overlay probe packet after source device 210 generates the overlay probe packet. Additionally, or alternatively, source device 210 may provide the overlay probe packet when source device 210 receives, from another device (e.g., network device 250), information indicating that source device 210 is to provide the overlay probe packet.

In some implementations, source device 210 may provide the overlay probe packet to the overlay tunnel endpoint associated with HYP 218 (e.g., to cause the overlay probe packet to travel through the overlay tunnel). Additionally, or alternatively, source device 210 may provide the overlay probe packet to network device 250 (e.g., a first network device 250 that is a first network hop associated with the overlay tunnel). In some implementations, source device 210 may provide the overlay probe packet such that the overlay probe packet is not encapsulated before being received by network device 250.

As further shown in FIG. 4, process 400 may include receiving the overlay probe packet associated with the overlay tunnel (block 420). For example, network device 250 may receive the overlay probe packet associated with the overlay tunnel. In some implementations, network device 250 may receive the overlay probe packet after source device 210 provides the overlay probe packet. Additionally, or alternatively, network device 250 may receive the overlay probe packet after another network device 250 provides the overlay probe packet, as described below.

In some implementations, network device 250 may receive the overlay probe packet and may provide the overlay probe packet to another network device 250. For example, assume that network device 250 receives an overlay probe packet that includes a TTL counter value of three. In this example, network device 250 may reduce the TTL counter value to two. Here, network device 250 may determine (e.g., based on the modified TTL counter value not being equal to zero and based on a configuration of network device 250) that network device 250 is to provide the overlay probe packet to another network device 250 (e.g., the next network hop associated with the overlay tunnel), and network device 250 may provide the overlay probe packet, accordingly. This process may be repeated until the modified TTL counter value is reduced to zero by a particular network device 250 (e.g., and the overlay probe packet is held and parsed, as described below).

Additionally, or alternatively, network device 250 may receive the overlay probe packet and may hold and parse the overlay probe packet. For example, assume that network device 250 receives an overlay probe packet that includes a TTL counter value of one. In this example, network device 250 may reduce the TTL counter value to zero. Here, network device 250 may determine (e.g., based on the modified TTL counter value being equal to zero and based on a configuration of network device 250) that network device 250 is to hold (e.g., not forward) and parse the overlay probe packet. In some implementations, network device 250 may parse the overlay probe packet such that network device 250 identifies the overlay probe packet as an overlay probe packet, as described below.

As further shown in FIG. 4, process 400 may include identifying the overlay probe packet as an overlay probe packet (block 425). For example, network device 250 may identify the overlay probe packet as an overlay probe packet. In some implementations, network device 250 may identify the overlay probe packet as an overlay probe packet after network device 250 receives the overlay probe packet. Additionally, or alternatively, network device 250 may identify the overlay probe packet as an overlay probe packet after network device 250 modifies a counter value included in the overlay probe packet (e.g., when the TTL counter value is equal to zero). Additionally, or alternatively, network device 250 may identify the overlay probe packet as an overlay probe packet when network device 250 holds and parses the overlay probe packet.

In some implementations, network device 250 may identify the overlay probe packet as an overlay probe packet based on parsing the overlay probe packet. For example, network device 250 may hold and parse the overlay probe packet (e.g., when the TTL counter included in the overlay probe packet is equal to zero), and may determine that the overlay probe packet includes an OAM header. In this example, network device 250 may identify the overlay probe packet as an overlay probe packet based on determining that the overlay probe packet includes an OAM header (e.g., when network device 250 is configured to identify a packet that includes an OAM header as an overlay probe packet). Additionally, or alternatively, network device 250 may identify the overlay probe packet as an overlay probe packet in another manner based on information (e.g., or a combination of information) included in the overlay probe packet.

As further shown in FIG. 4, process 400 may include storing state information, associated with the overlay tunnel, based on identifying the overlay probe packet as an overlay probe packet (block 430). For example, network device 250 may store state information, associated with the overlay tunnel, based on identifying the overlay probe packet as an overlay probe packet. In some implementations, network device 250 may store the state information after network device 250 identifies the overlay probe packet as an overlay probe packet. Additionally, or alternatively, network device 250 may store the state information after network device 250 parses the overlay probe packet.

State information may include information associated with the overlay tunnel that passes traffic via the underlay path that includes network device 250. For example that state information may include information that identifies overlay network 230 associated with the overlay tunnel (e.g., the VNID of the VXLAN), information that identifies the first overlay tunnel endpoint associated with the overlay tunnel (e.g., the MAC address of the VTEP associated with HYP 218, the IP address of the VTEP associated with HYP 218, etc.), information that identifies the second overlay tunnel endpoint associated with the overlay tunnel (e.g., the MAC address of the VTEP associated with HYP 228, the IP address of the VTEP associated with HYP 228, etc.), information that identifies VM 214 (e.g., the MAC address, the IP address, etc.), information that identifies VM 224 (e.g., the MAC address, the IP address, etc.), and/or another type of information associated with the overlay tunnel.

In some implementations, network device 250 may determine the state information based on parsing the overlay probe packet. For example, network device 250 parse the overlay probe packet to determine the state information (e.g., included in one or more packet headers of the overlay probe packet), and network device 250 may store the state information determined based on parsing the overlay probe packet. In some implementations, network device 250 may store the state information in a memory location (e.g., a RAM, a ROM, a cache, a hard disk, etc.) of network device 250. Additionally, or alternatively, network device 250 may provide the state information to another device for storage.

In some implementations, network device 250 may store state information associated with multiple overlay tunnels (e.g., when network device 250 lies on multiple underlay paths that correspond to multiple overlay tunnels). In this way, network device 250 may store state information associated with multiple overlay tunnels, and network device 250 may be queried (e.g., by an administrator device associated with network device 250) to determine the state information associated with network device 250.

In some implementations, network device 250 may delete and/or modify stored state information, associated with the overlay tunnel, at a later time. For example, source device 210 (e.g., the OAM module) may determine (e.g., after network device 250 has stored the state information associated with the overlay tunnel) that an overlay tunnel has been terminated, and source device 210 may provide to network device 250, information indicating that the overlay tunnel has been terminated. In this example, network device 250 may receive the indication that the overlay tunnel has been terminated, and network device 250 may delete the state information, associated with the overlay tunnel, accordingly. In some implementations, source device 210 may provide the information indicating that the overlay tunnel has been terminated, modified, etc. in a manner similar to that described above (e.g., source device 210 may provide multiple probe packets that include the indication, and each packet may be forwarded and/or parsed based on a counter included in each probe packet, etc.). In this way, network device 250 may store up-to-date state information associated with one or more overlay tunnels that pass traffic through network device 250.

As further shown in FIG. 4, process 400 may include providing a response packet that includes underlay path information associated with the overlay tunnel and the network device (block 435). For example, network device 250 may provide a response packet that includes underlay path information associated with the overlay tunnel and network device 250. In some implementations, network device 250 may provide the response packet after network device 250 stores the state information associated with network device 250. Additionally, or alternatively, network device 250 may provide the response information after network device 250 identifies the overlay probe packet as an overlay probe packet.

A response packet may include a packet, generated by network device 250, that includes underlay path information indicating that network device 250 lies on the underlay path that corresponds to the overlay tunnel identified in the overlay probe packet. For example, the response packet may include underlay path information that includes information associated with the overlay tunnel (e.g., the VNID, information that identifies VTEPs associated with the overlay tunnel, information that identifies VM 214, information that identifies VM 224, etc.), information that identifies network device 250 (e.g., a device name a device serial number, an IP address, etc.), information that identifies an interface via which traffic, associated with the overlay tunnel, may be received and/or sent by network device 250, performance information associated with network device 250 (e.g., an amount of central processing unit (CPU) usage, a port condition, a number of packet queues, etc.), or another type of information associated with network device 250.

In some implementations, network device 250 may generate the response packet such that the response packet may be provided to source device 210 (e.g., directly or via one or more other network devices 250).

As further shown in FIG. 4, process 400 may include receiving the response packet that includes the underlay path information associated with the overlay tunnel and the network device (block 440). For example, source device 210 (e.g., the OAM module) may receive the response packet that includes the underlay path information associated with the overlay tunnel and network device 250. In some implementations, source device 210 may receive the response packet after network device 250 provides the response packet. Additionally, or alternatively, source device 210 may receive the response packet after the response packet is provided to source device 210 (e.g., by one or more other network devices 250).

As further shown in FIG. 4, process 400 may include storing the underlay path information (block 445). For example, source device 210 may store the underlay path information. In some implementations, source device 210 may store the underlay path information after source device 210 receives the response packet including the underlay path information. Additionally, or alternatively, source device 210 may store the underlay path information when source device 210 receives, from another device, information indicating that source device 210 is to store the underlay path information.

In some implementations, source device 210 may store the underlay path information in a memory location (e.g., VS 216, a RAM, a ROM, a cache, a hard disk, etc.) of source device 210. Additionally, or alternatively, source device 210 may provide the underlay path information to another device for storage.

In some implementations, source device 210 may store underlay path information associated with multiple network devices 250 that lie on the underlay path associated with the overlay tunnel (e.g., when multiple network devices 250 lie on the underlay path that corresponds to the overlay tunnel). In this way, source device 210 may store underlay path information that identifies each network device 250 that lies on the underlay path that corresponds to the overlay tunnel.

In some implementations, source device 210 may continue providing overlay probe packets, associated with the overlay tunnel and in the manner described above, until source device 210 receives an indication that an overlay probe packet has reached the other overlay tunnel endpoint of the overlay tunnel. For example, source device 210 may provide a first overlay probe packet, receive a first response packet from a first network device 250, provide a second overlay probe packet, receive a second response packet from a second network device 250, provide a third overlay probe packet, and receive, from destination device 220 (e.g., HYP 224), a third response packet indicating that the third overlay probe packet reached the end of the overlay tunnel (e.g., a VTEP associated with HYP 224). At this point, source device 210 may stop generating and providing overlay probe packets (e.g., since source device 210 has received a response packet associated with each network device 250 that lies on the underlay path).

In this way, source device 210 may probe an overlay tunnel and determine underlay path information associated with an underlay path that corresponds to the overlay tunnel. In some implementations, the stored underlay path information, associated with the overlay tunnel, may be queried (e.g., via a REST API) by a user of source device 210 in order to determine a full underlay path that corresponds to the overlay tunnel, identify a hot spot in the underlay path for the overlay tunnel, determine underlay path utilization for the overlay tunnel, to perform network diagnostics, etc.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. For the purposes of example implementation 500, assume that a source device 210 (e.g., server device A) includes an APP 212 (e.g., an OAM module) and a VM 214 (e.g., VM A) that is managed by a HYP 218 (e.g., HYP A). Further, assume that a destination device 220 (e.g., server device B) includes a VM 224 (e.g., VM B) that is managed by a HYP 228 (e.g., HYP B). Also, assume that VM A is configured to communicate with VM B via an overlay network 230 (e.g., VXLAN 500) that includes an overlay tunnel with a first overlay tunnel endpoint (e.g., VTEP 1) and a second overlay tunnel endpoint (e.g., VTEP 2).

Figure 5A:
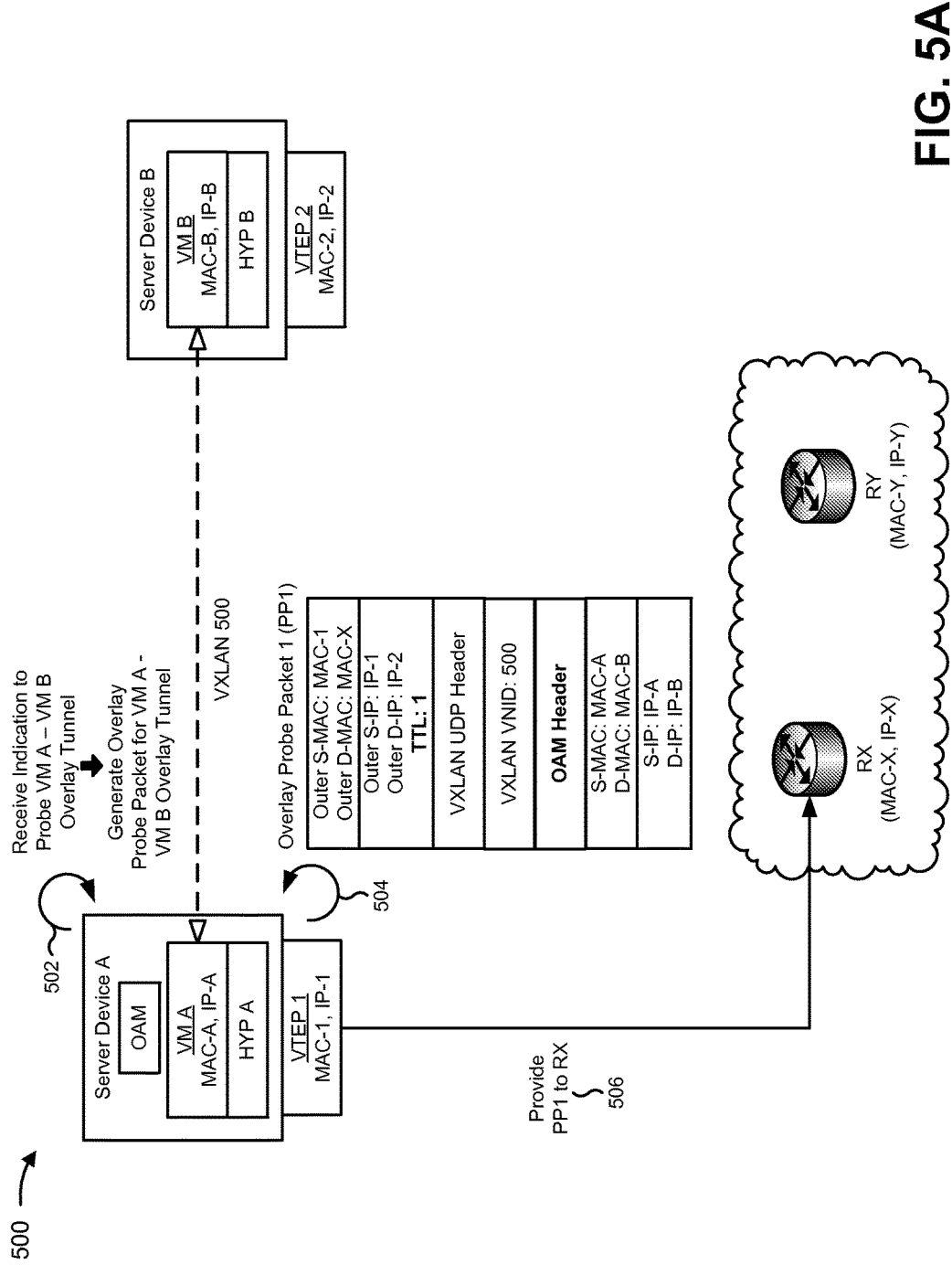
FIGS. 5A-5F are diagrams of an example implementation relating to the example process shown in FIG. 4.

As shown in FIG. 5A, and by reference number 502, server device A (e.g., the OAM module) may receive (e.g., via a REST API associated with the OAM module) information indicating that server device A is to probe the overlay tunnel between VM A and VM B. As shown, server device A may determine, based on receiving the information, that server device A is to generate an overlay probe packet for the overlay tunnel between VM A and VM B.

As shown by reference number 504, server device A (e.g., the OAM module, HYP A) may generate a first overlay probe packet (e.g., PP1). As shown, PP1 may include an outer MAC header that includes a MAC address that identifies VTEP 1 (e.g., Outer S-MAC: MAC-1) and a MAC address that identifies a first network device 250, identified as RX (e.g., Outer D-MAC: MAC-X), associated with the overlay tunnel. As shown, PP1 may also include an outer IP header that includes an IP address that identifies VTEP 1 (e.g., S-IP: IP-1), an IP address that identifies VTEP 2 (e.g., D-IP: IP-2), and a TTL counter with a value of 1 (e.g., TTL: 1). As further shown PP1 may include an outer UDP header (e.g., including information that identifies a source port associated with VXLAN 500 and information that identifies a destination port associated with VXLAN 500, etc.), a VXLAN header that includes information that identifies VXLAN 500 (e.g., VXLAN VNID: 500), and an OAM header (e.g., including information that identifies a port associated with the OAM module and information that identifies PP1 as an overlay probe packet). As further shown, PP1 may also include a payload that includes a MAC address that identifies VM A (e.g., S-MAC: MAC-A), a MAC address that identifies VM B (e.g., D-MAC: MAC-B), an IP address that identifies VM A (e.g., S-IP: IP-A) and an IP address that identifies VMB (e.g., D-IP: IP-B). As shown by reference number 506, server device A may provide PP1 to RX (e.g., via VTEP 1 and based on the information included in the outer MAC header).

Figure 5B:
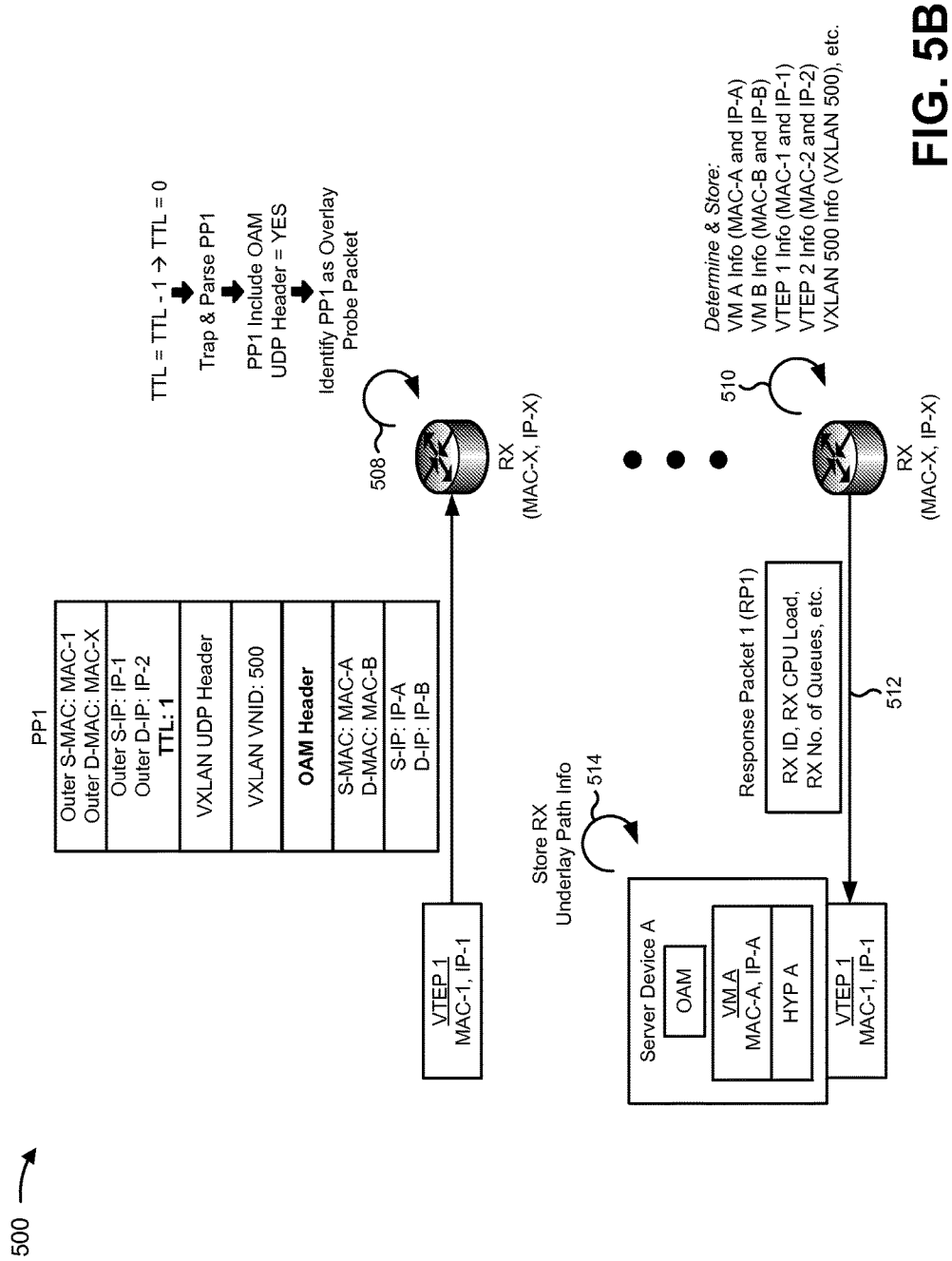

As shown in FIG. 5B, and by reference number 508, RX may receive PP1 and may decrease the TTL counter value, included in PP1, by 1 (e.g., TTL=TTL−1→TTL=0). As shown, RX may determine (e.g., based on the TTL counter being equal to 0 and based on a configuration of RX) that RX is to hold and parse PP1. As further shown, RX may then determine (e.g., based on holding and parsing PP1) that PP1 includes an OAM header. As shown, based on determining that PP1 includes an OAM header, RX may identify PP1 as an overlay probe packet (e.g., assume that RX is configured to identify a packet as an overlay probe packet when RX determines that the packet includes an OAM header).

As shown by reference number 510, RX may continue parsing PP1 based on identifying PP1 as an overlay probe packet, and may determine and store state information associated with the overlay tunnel. As shown, RX may determine state information that includes information associated with VM A, VM B, VTEP 1, VTEP 2, VXLAN 500, and other information associated with the VM A-VM B overlay tunnel that passes traffic via an underlay path that includes RX.

As shown by reference number 512, RX may generate a first response packet (e.g., RP1) that includes underlay path information associated with RX (e.g., an RX device identifier, an amount of RX CPU usage, a number of RX traffic queues, etc.), and may provide RP1 to server device A (e.g., via VTEP 1). As shown by reference number 514, server device A may receive RP1 and may store the underlay path information associated with RX (e.g., indicating that the underlay path, associated with the overlay tunnel, includes RX as a first network hop).

Figure 5C:
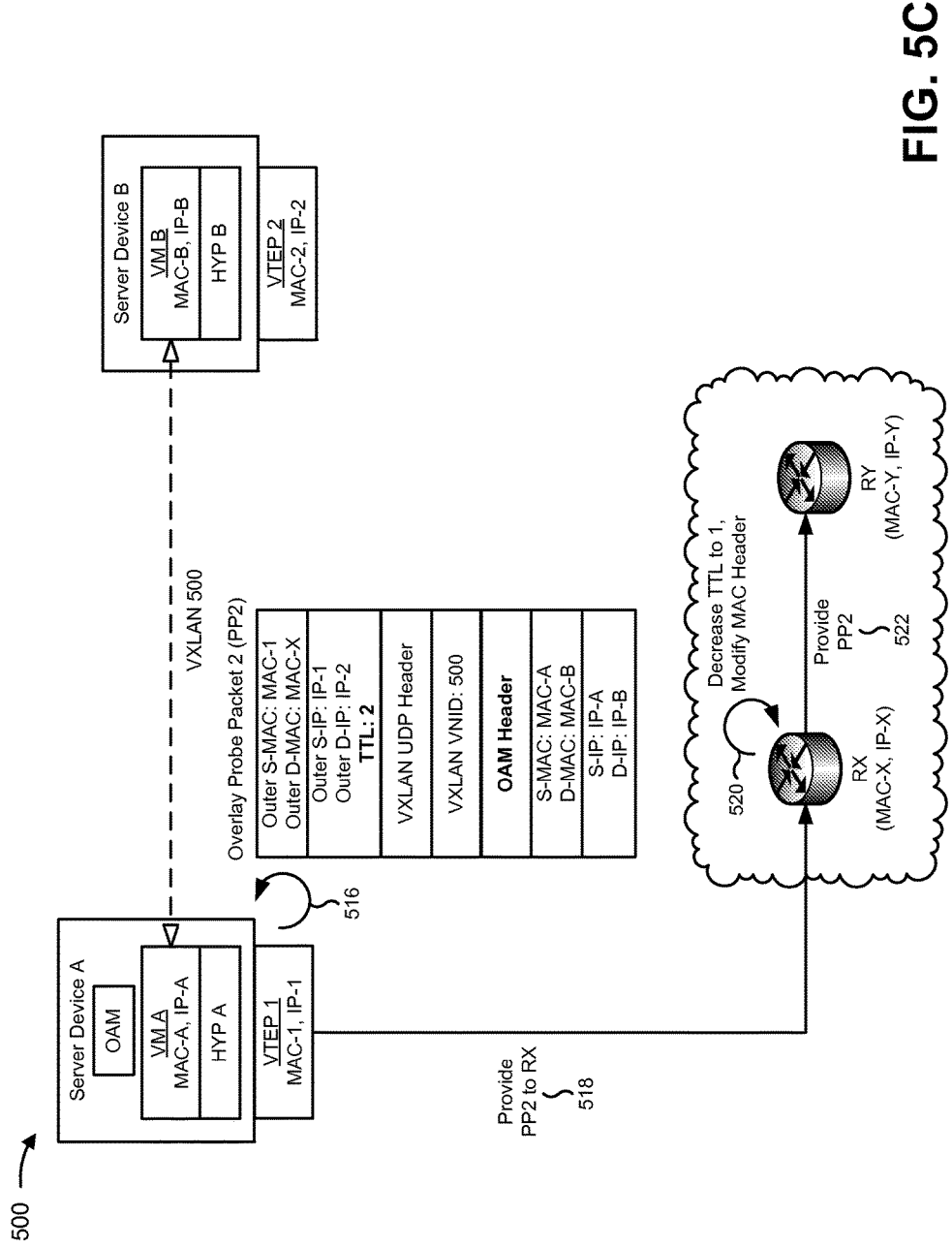

As shown in FIG. 5C, and by reference number 516, server device A may generate (e.g., based on storing the underlay information associated with RX) a second overlay probe packet (e.g., PP2). As shown, service device A may generate PP2 such that PP2 is identical to PP1 except that the TTL counter value included in PP2 is set to 2.

As shown by reference number 518, server device A may provide (e.g., via VTEP 1 and based on the information included in the outer MAC header) PP2 to RX. As shown by reference number 520, RX may decrease the TTL counter value (e.g., from 2 to 1), may determine (e.g., based on the TTL counter value not being equal to 0) that RX is to provide PP2 to a second network device 250 (e.g., RY) associated with the overlay tunnel. As shown by reference number 522, RX may then provide PP2 to RY.

Figure 5D:
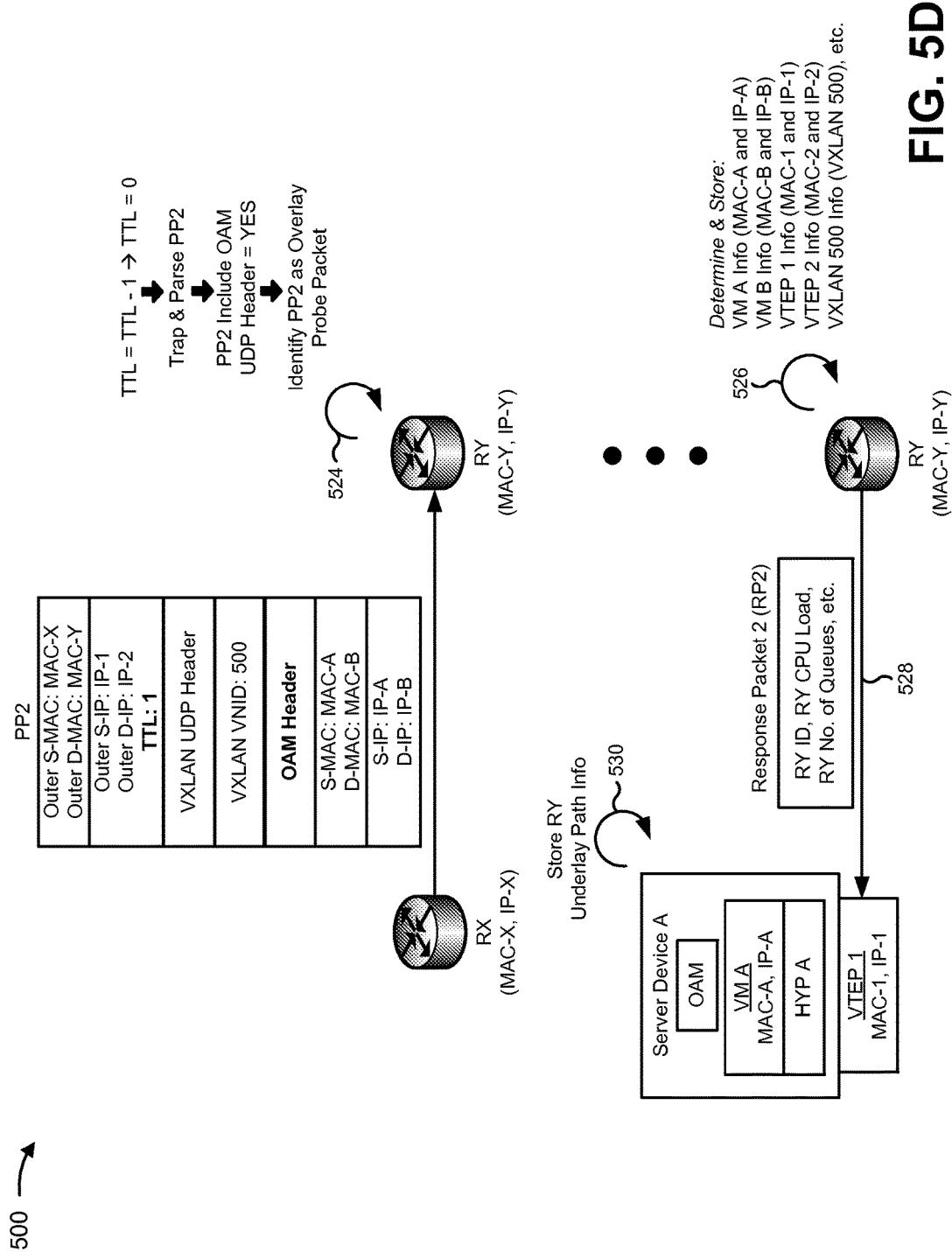

As shown in FIG. 5D, and by reference number 524, RY may receive PP2 and may decrease the TTL counter value, included in PP2, by 1 (e.g., TTL=TTL−1→TTL=0). As shown, RY may determine (e.g., based on the TTL counter value being equal to 0 and based on a configuration of RY) that RY is to hold and parse PP2. As further shown, RY may then determine (e.g., based on holding and parsing PP2) that PP2 includes an OAM header. As shown, based on determining that PP2 includes an OAM header, RY may identify PP2 as an overlay probe packet (e.g., assume that RY is configured to identify a packet as an overlay probe packet when the RY determines that the packet includes an OAM header).

As shown by reference number 526, RY may continue parsing PP2 based on identifying PP2 as an overlay probe packet, and may determine and store state information associated with the overlay tunnel. As shown, RY may determine state information that includes information associated with VM A, VM B, VTEP 1, VTEP 2, VXLAN 500, and other information associated with the VM A-VM B overlay tunnel that passes traffic via an underlay path that includes RY.

As shown by reference number 528, RY may generate a second response packet (e.g., RP2) that includes underlay path information associated with RY (e.g., an RY device identifier, an amount of RY CPU usage, a number of RY traffic queues, etc.), and may provide RP2 to server device A (e.g., via RX and VTEP 1). As shown by reference number 530, server device A may receive RP2 and may store the underlay path information associated with RY (e.g., indicating that the underlay path, associated with the overlay tunnel, includes RY as a second network hop).

Figure 5E:
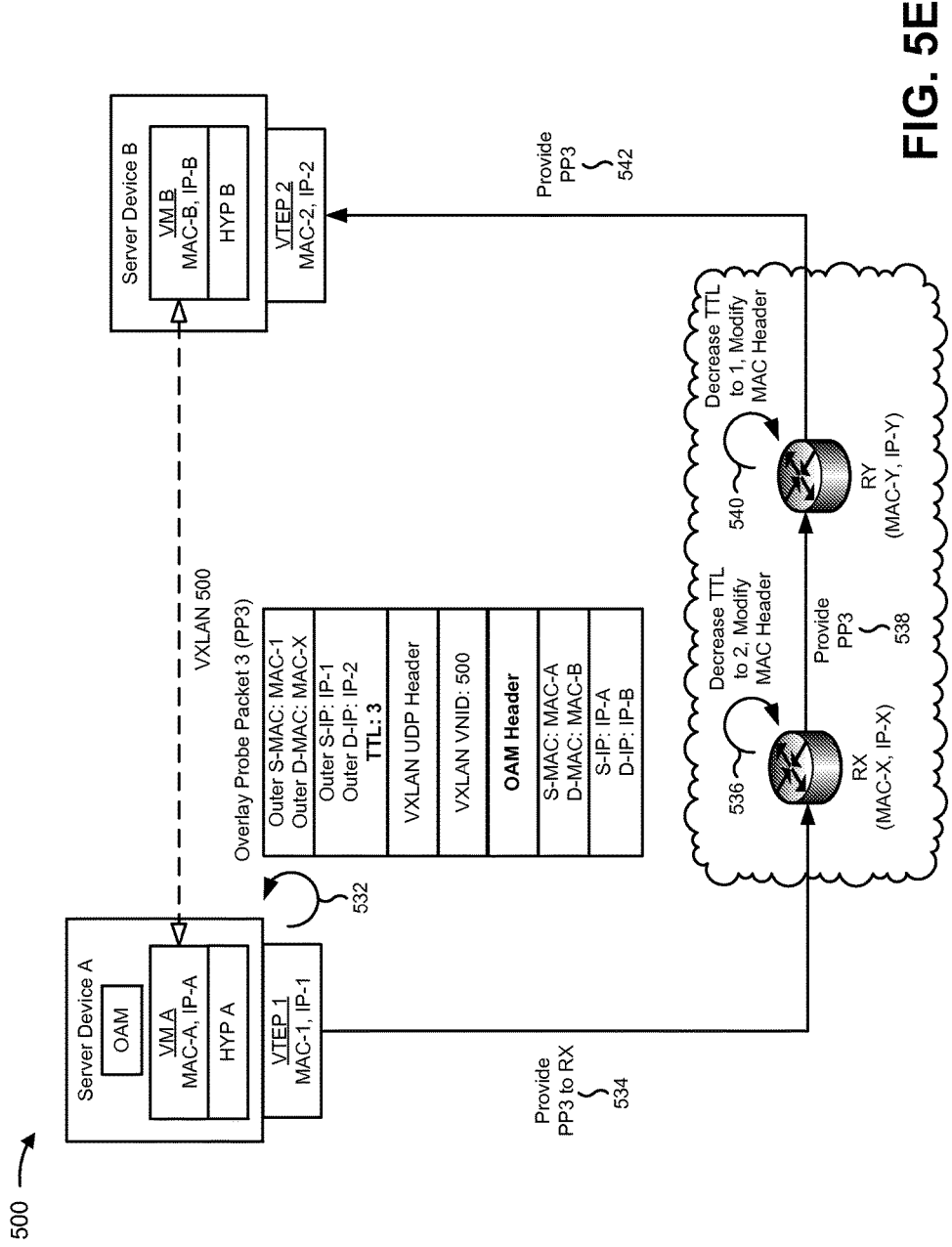

As shown in FIG. 5E, and by reference number 532, server device A may generate (e.g., based on storing the underlay information associated with RY) a third overlay probe packet (e.g., PP3). As shown, service device A may generate PP3 such that PP3 is identical to PP1 and PP2 except that the TTL counter value included in PP3 is set to 3.

As shown by reference number 534, server device A may provide (e.g., via VTEP 1 and based on the information included in the outer MAC header) PP3 to RX. As shown by reference number 536, RX may decrease the TTL counter value (e.g., from 3 to 2), may determine (e.g., based on the TTL counter value not being equal to 0) that RX is to provide PP3 to RY, and, as shown by reference number 538, RX may provide PP3 to RY.

As shown by reference number 518, server device A may provide (e.g., via VTEP 1 and based on the information included in the outer MAC header) PP2 to RX. As shown by reference number 520, RX may decrease the TTL counter value (e.g., from 2 to 1), may determine (e.g., based on the TTL counter value not being equal to 0) that RX is to provide PP2 to a second network device 250 (e.g., RY) associated with the overlay tunnel. As shown by reference number 522, RX may then provide PP2 to RY.

As shown, RY may receive PP3 from RX, and as shown by reference number 540, RY may decrease the TTL counter value (e.g., from 2 to 1), may determine (e.g., based on the TTL counter value not being equal to 0) that RY is to provide PP3 to VTEP 2 (e.g., assume that no other network devices lie on the underlay path that corresponds to the overlay tunnel). As shown by reference number 542, RY may then provide PP3 to VTEP 2.

Figure 5F:
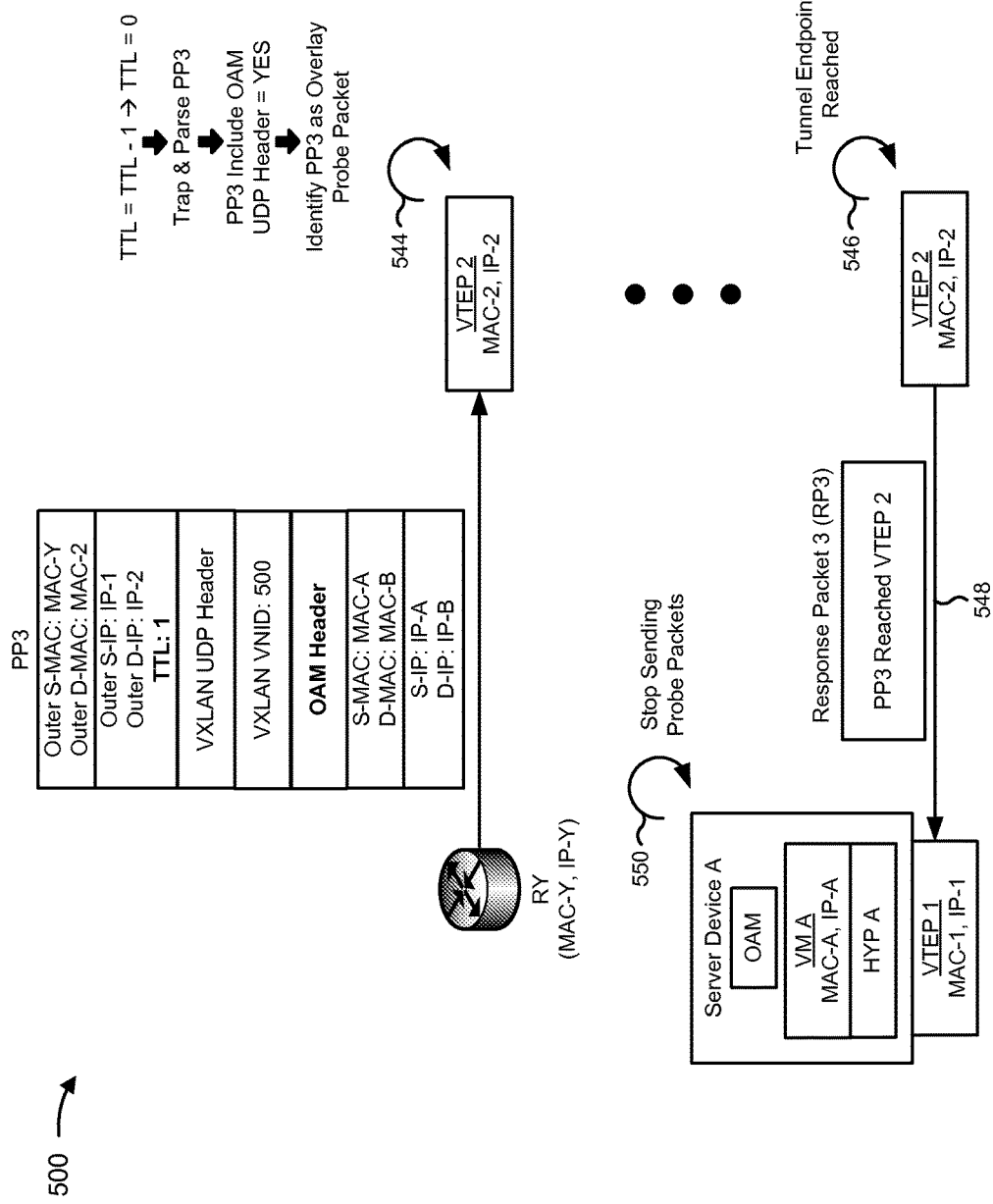

As shown in FIG. 5F, and by reference number 544, VTEP 2 (e.g., HYP B) may receive PP3 and may decrease the TTL counter value, included in PP3, by 1 (e.g., TTL=TTL−1→TTL=0). As shown, VTEP 2 may determine (e.g., based on the TTL counter being equal to 0 and based on a configuration of VTEP 2) that VTEP 2 is to hold and parse PP3. As further shown, VTEP 2 may then determine (e.g., based on holding and parsing PP3) that PP3 includes an OAM header. As shown, based on determining that PP3 includes an OAM header, VTEP 2 may identify PP3 as an overlay probe packet (e.g., assume that VTEP 2 is configured to identify a packet as an overlay probe packet when the VTEP 2 determines that the packet includes an OAM header).

As shown by reference number 546, VTEP 2 may determine, based on identifying PP3 as an overlay probe packet that PP3 has reached the endpoint of the overlay tunnel (e.g., since VTEP 2 lies at the end of the overlay tunnel). As shown by reference number 548, VTEP 2 may generate a third response packet (e.g., RP3) that indicates that PP3 reached the end of the overlay tunnel identified in PP3, and may provide RP3 to server device A (e.g., via RX, RY, and VTEP 1). As shown by reference number 550, server device A may receive RP3 and may stop providing overlay probe packets (e.g., since PP3 reached VTEP 2). At this point, server device A stores underlay path information (e.g., underlay path information associated with RX and underlay path information associated with RY) that corresponds to the overlay tunnel between VM A and VM B.

As indicated above, FIGS. 5A-5F are provided merely as an example. Other examples are possible and may differ from what was described with regard to FIGS. 5A-5F.

Implementations described herein may allow a source device to probe an overlay tunnel in order to determine underlay path information associated with an underlay path that corresponds to the overlay tunnel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
    one or more instructions that, when executed by one or more processors, cause the one or more processors to:
        generate an overlay probe packet,
            the overlay probe packet including information associated with an overlay tunnel included in an overlay network,
                the overlay tunnel including a first tunnel endpoint and a second tunnel endpoint, and
                the overlay tunnel corresponding to an underlay path, associated with an underlay network, between the first tunnel endpoint and the second tunnel endpoint;
        provide the overlay probe packet via the first tunnel endpoint,
            the overlay probe packet being provided to cause the overlay probe packet to be parsed by a network device that lies on the underlay path;
        receive a response packet that includes underlay path information,
            the response packet being associated with the overlay probe packet and being provided by the network device, and
            the underlay path information including information associated with the network device; and
        store the underlay path information,
            the underlay path information being stored to indicate that the network device lies on the underlay path.

2. The computer-readable medium of claim 1, where the overlay probe packet is a first overlay probe packet, and the response packet is a first response packet,
    where the one or more instructions, when executed by the one or more processors, further cause the one or more processors to:
        generate a second overlay probe packet that includes the information associated with the overlay tunnel;
        provide the second overlay probe packet via the first tunnel endpoint,
            the second overlay probe packet being provided to cause the second overlay probe packet to be parsed by another network device that lies on the underlay path;
        receive a second response packet that includes other underlay path information,
            the second response packet being associated with the second overlay probe packet and being provided by the other network device, and
            the other underlay path information including information associated with the other network device; and
        store the other underlay path information,
            the other underlay path information being stored to indicate that the other network device lies on the underlay path.

3. The computer-readable medium of claim 1, where the overlay probe packet is a first overlay probe packet, and the response packet is a first response packet,
    where the one or more instructions, when executed by the one or more processors, further cause the one or more processors to:
        generate a second overlay probe packet including the information associated with the overlay tunnel;
        provide the second overlay probe packet via the first tunnel endpoint;
        receive a second response packet that includes an indication that the second overlay probe packet reached the second tunnel endpoint,
            the second response packet being associated with the second overlay probe packet; and
        stop providing overlay probe packets, associated with the overlay tunnel, based on receiving the indication that the second overlay probe packet reached the second tunnel endpoint.

4. The computer-readable medium of claim 1, where the one or more instructions, that cause the one or more processors to generate the overlay probe packet, cause the one or more processors to:
generate the overlay probe packet such that the overlay probe packet includes information that allows the overlay probe packet to be identified as an overlay probe packet.

5. The computer-readable medium of claim 1, where the overlay tunnel is associated with a virtual extensible local area network (VXLAN);
the first tunnel endpoint is a first VXLAN tunnel endpoint (VTEP); and
the second tunnel endpoint is a second VTEP.

6. The computer-readable medium of claim 1, where the one or more instructions, that cause the one or more processors to generate the overlay probe packet, further cause the one or more processors to:
generate the overlay probe packet such that the overlay probe packet is to travel along the underlay path for a particular number of network hops,
the particular number of network hops being identified in the overlay probe packet, and
the network device lying on the underlay path at the particular number of network hops.

7. The computer-readable medium of claim 1, where the one or more instructions, that cause the one or more processors to provide the overlay probe packet via the first tunnel endpoint, further cause the one or more processors to:
provide the overlay probe packet to cause the network device to store the information associated with the overlay tunnel included in the overlay probe packet.

8. A method, comprising:
generating, by a device, an overlay probe packet,
the overlay probe packet including information associated with an overlay tunnel included in an overlay network,
the overlay tunnel including a first tunnel endpoint and a second tunnel endpoint, and
the overlay tunnel corresponding to an underlay path, associated with an underlay network, between the first tunnel endpoint and the second tunnel endpoint;
providing, by the device, the overlay probe packet via the first tunnel endpoint,
the overlay probe packet being provided to cause the overlay probe packet to be parsed by a network device that lies on the underlay path;
receiving, by the device, a response packet that includes underlay path information,
the response packet being associated with the overlay probe packet and being provided by the network device, and
the underlay path information including information associated with the network device; and
storing, by the device, the underlay path information,
the underlay path information being stored to indicate that the network device lies on the underlay path.

9. The method of claim 8, where the overlay probe packet is a first overlay probe packet, and the response packet is a first response packet; and
where the method further comprises:
generating a second overlay probe packet that includes the information associated with the overlay tunnel;
providing the second overlay probe packet via the first tunnel endpoint,
the second overlay probe packet being provided to cause the second overlay probe packet to be parsed by another network device that lies on the underlay path;
receiving a second response packet that includes other underlay path information,
the second response packet being associated with the second overlay probe packet and being provided by the other network device, and
the other underlay path information including information associated with the other network device; and
storing the other underlay path information,
the other underlay path information being stored to indicate that the other network device lies on the underlay path.

10. The method of claim 8, where the overlay probe packet is a first overlay probe packet, and the response packet is a first response packet; and
where the method further comprises:
generating a second overlay probe packet including the information associated with the overlay tunnel;
providing the second overlay probe packet via the first tunnel endpoint;
receiving a second response packet that includes an indication that the second overlay probe packet reached the second tunnel endpoint,
the second response packet being associated with the second overlay probe packet; and
stopping providing overlay probe packets, associated with the overlay tunnel, based on receiving the indication that the second overlay probe packet reached the second tunnel endpoint.

11. The method of claim 8, where generating the overlay probe packet comprises:
generating the overlay probe packet such that the overlay probe packet includes information that allows the overlay probe packet to be identified as an overlay probe packet.

12. The method of claim 8, where the overlay tunnel is associated with a virtual extensible local area network (VXLAN);
where the first tunnel endpoint is a first VXLAN tunnel endpoint (VTEP); and
where the second tunnel endpoint is a second VTEP.

13. The method of claim 8, where generating the overlay probe packet comprises:
generating the overlay probe packet such that the overlay probe packet is to travel along the underlay path for a particular number of network hops,
the particular number of network hops being identified in the overlay probe packet, and
the network device lying on the underlay path at the particular number of network hops.

14. The method of claim 8, where providing the overlay probe packet via the first tunnel endpoint comprises:
providing the overlay probe packet to cause the network device to store the information associated with the overlay tunnel included in the overlay probe packet.

15. A device, comprising:
one or more processors to:
generate an overlay probe packet,
the overlay probe packet including information associated with an overlay tunnel included in an overlay network,
the overlay tunnel including a first tunnel endpoint and a second tunnel endpoint, and the overlay tunnel corresponding to an underlay path, associated with an underlay network, between the first tunnel endpoint and the second tunnel endpoint;

provide the overlay probe packet via the first tunnel endpoint,
the overlay probe packet being provided to cause the overlay probe packet to be parsed by a network device that lies on the underlay path;

receive a response packet that includes underlay path information,
the response packet being associated with the overlay probe packet and being provided by the network device, and
the underlay path information including information associated with the network device; and store the underlay path information,
the underlay path information being stored to indicate that the network device lies on the underlay path.

16. The device of claim 15, where the overlay probe packet is a first overlay probe packet, and the response packet is a first response packet; and
where the one or more processors are further to:
generate a second overlay probe packet that includes the information associated with the overlay tunnel;
provide the second overlay probe packet via the first tunnel endpoint,
the second overlay probe packet being provided to cause the second overlay probe packet to be parsed by another network device that lies on the underlay path;
receive a second response packet that includes other underlay path information,
the second response packet being associated with the second overlay probe packet and being provided by the other network device, and
the other underlay path information including information associated with the other network device; and
store the other underlay path information,
the other underlay path information being stored to indicate that the other network device lies on the underlay path.

17. The device of claim 15, where the overlay probe packet is a first overlay probe packet, and the response packet is a first response packet; and
where the one or more processors are further to:
generate a second overlay probe packet including the information associated with the overlay tunnel;
provide the second overlay probe packet via the first tunnel endpoint;
receive a second response packet that includes an indication that the second overlay probe packet reached the second tunnel endpoint,
the second response packet being associated with the second overlay probe packet; and
stop providing overlay probe packets, associated with the overlay tunnel, based on receiving the indication that the second overlay probe packet reached the second tunnel endpoint.

18. The device of claim 15, where the one or more processors, when generating the overlay probe packet, are to:
generate the overlay probe packet such that the overlay probe packet includes information that allows the overlay probe packet to be identified as an overlay probe packet.

19. The device of claim 15, where the overlay tunnel is associated with a virtual extensible local area network (VXLAN);
where the first tunnel endpoint is a first VXLAN tunnel endpoint (VTEP); and
where the second tunnel endpoint is a second VTEP.

20. The device of claim 15, where the one or more processors, when generating the overlay probe packet, are to:
generate the overlay probe packet such that the overlay probe packet is to travel along the underlay path for a particular number of network hops,
the particular number of network hops being identified in the overlay probe packet, and
the network device lying on the underlay path at the particular number of network hops.

* * * * *